United States Patent [19]

Root

[11] 3,893,511

[45] July 8, 1975

[54] FOAM RECOVERY PROCESS

[75] Inventor: Paul J. Root, Norman, Okla.

[73] Assignee: Sun Oil Company, Southland Center, Tex.

[22] Filed: June 9, 1971

[21] Appl. No.: 151,535

[52] U.S. Cl. ............................. 166/305 R; 166/274
[51] Int. Cl.² ......................................... E21B 43/16
[58] Field of Search........ 166/270, 275, 300, 305 R, 166/309, 311, 274

[56] References Cited
UNITED STATES PATENTS

| | | | |
|---|---|---|---|
| 2,053,285 | 8/1936 | Grebe | 166/305 R |
| 3,460,623 | 8/1969 | Leach | 166/275 |
| 3,491,832 | 1/1970 | Raza | 166/305 R |

*Primary Examiner*—Frank L. Abbott
*Assistant Examiner*—Jack E. Ebel
*Attorney, Agent, or Firm*—George L. Church; Donald R. Johnson; John E. Holder

[57] ABSTRACT

A recovery process for use in formations having a dual porosity or permeability system, which comprises injecting alternate slugs of gas and a foaming agent solution to generate a foam in the high porosity or permeability portions of the reservoir to facilitate gas entering the low porosity or permeability reservoir portions, and then producing fluids from the formation.

4 Claims, No Drawings

FOAM RECOVERY PROCESS

BACKGROUND OF THE INVENTION

This invention relates to the production of petroleum by secondary recovery methods and in particular concerns the use of a foam to aid in oil recovery.

At the present time, there are many secondary recovery processes used to increase recovery from an oil bearing formation. One such process uses liquid flooding agents which are injected into the formation and used to drive formation oil to an adjacent well. Additionally, there is the fire flood process which burns a portion of the reservoir oil to lower its viscosity and provide a driving force to move the oil to production wells. Water and gas injection processes also have been used for maintaining reservoir pressure to increase oil recovery. All of these methods work most efficiently when a fairly uniform formation is the subject of the recovery process. All too often, however, and in fact in a majority of cases, the formations are not uniform both as to porosity and permeability. In such situations, modification of the basic recovery process can often diminish the effect of the formation inconsistencies.

A type of formation which has not lent itself to effective recovery processes or modifications thereof is one having a low permeability matrix which has been extensively fractured or which has high permeability streaks running through the basic formation matrix. In such a situation, the fractures or streaks have a permeability which is quite high and is drastically different from the unfractured or base matrix. Where the matrix is of a density that effectively does not allow liquids to pass therethrough, water floods and floods using a more viscous liquid cannot be used, especially since the flooding liquid will tend to by-pass the low permeability matrix, preferring to follow instead the highly permeable fractures or streaks. A fire flood in such a reservoir also is not effective due to the fire following the fracture system or highly permeable streaks and by-passing the low permeability matrix. Water and gas injection used to raise formation pressure is also not practical due to the inability of creating a drive mechanism able to force the oil from the matrix and into the permeable fractures or streaks. The increased pressure will tend to act on the fractures and not the matrix.

Basically, of the present known recovery methods none appear particularly helpful in aiding recovery from a formation having highly dissimilar porosity or permeability portions.

It is accordingly an object of the present invention to provide an improved recovery process for reservoirs having zones of highly dissimilar permeabilities.

SUMMARY OF THE INVENTION

With these and other objects in view, the present invention contemplates injecting a gas and a foaming agent solution into the formation, and subsequently producing fluids from the formation.

DESCRIPTION OF THE INVENTION

In order to understand the nature of this invention and the advantages provided thereby, it is necessary to appreciate some of the basic factors involved in secondary recovery operations, especially regarding such operations when applied to reservoirs having streaks or fractures of relatively high permeability when compared with the basic formation matrix. Generally, oil is located in pore space between sand grains or the grains of other sedimentary deposits. Ordinarily, a substantial portion of the oil in a formation can be produced through the driving action of gas contained in solution in the oil. In addition to solution gas drive, there may be large compressed aquifers which drive the oil with their expansive powers. An expanding gas cap may also be the driving force in moving oil to production wells.

Water flooding is one of the most frequently used secondary recovery processes and basically consists of pumping water down the wellbore and into the formation so that water acts as a displacing agent in forcing the oil from its resting place through the formation and to the production well. Polymers and detergents as well as other highly viscous fluids have been used in much the same manner and these fluids are used for increasing the displacement efficiency. The flooding fluids used will tend to follow the path of least resistance, i.e., the most permeable areas of the reservoir.

Fire flooding, another well known recovery process, involves igniting formation fluids adjacent the wellbore ordinarily by contacting the formation with heated air. The flame front tends to follow the path that the injected air takes, and since the air also follows the path of least resistance, there tends to be a channeling of the flame front along the strata of high permeability.

It can thus be seen that the normal secondary recovery processes depend a great deal on the fairly uniform permeability. Production well withdrawal rates and selective plugging of permeable zones may result in a fairly efficient sweep of the reservoir, however, in formations having large permeability differences such improvement is limited. There also has been suggested a secondary process utilizing foam. The foam has been proposed for use as a displacement medium, much the same way as the detergent and polymer floods previously discussed. It has been found, however, that the foam effectively will not move through the formation because of its high resistance to flow when placed in a porous medium such as a formation. This phenomenon known as Jamin Effect prevents the effective utilization of foam as a displacement medium. Jamin Effect occurs because of a tendency for gas bubbles to lodge in the restrictions of a porous media which greatly impairs or terminates flow through the media. Accordingly, foam has been used with some success as a blocking agent. Thus, foam has been used to prevent communication between a gas cap and an oil zone, to prevent encroachment of a water zone, or to block highly permeable zones so that the less permeable portions of the reservoir can be flushed by conventional methods.

It is here proposed that foam be used in a different manner in reservoirs with highly permeable fractures or permeability streaks. It is also especially useful for the type of reservoir where the bulk of the formation oil is held in a dense matrix and which has no gas in solution to act to drive the oil from the matrix. Oil which has no gas in solution is usually termed "dead oil." In a formation having a high permeability variance repressuring by use of water injection or gas injection is usually not helpful.

A typical reservoir will now be described for which the instant foam recovery process is especially applicable. This typical reservoir is a highly fractured limestone formation having a large water aquifer positioned below it. The formation is composed primarily of broken, crushed and weathered chert. The chert itself constitutes the solid material of the rock matrix and it has essentially no porosity or permeability. The porosity in the formation is in the form of a porous network around the pieces of chert. This porosity system has a relatively low permeability which would ordinarily be less than 10 millidarcies. The porosity in the matrix contains large volumes of formation fluids, but such fluids have no gas in solution to aid in movement of the oil. This matrix is cut by vertical fractures which extend down into the aquifer. The permeability of these vertical fractures is many times the matrix permeability, and thus they have the capability of transmitting reservoir fluids at high rates. When wells are drilled into such a formation the oil contained in the fractures is produced and some oil in the matrix is also produced due to rock and liquid expansion. Because of the high permeability of the fractures relative to the matrix, water from the aquifer tends to rise through the fractures to the producing wells.

As the production from the wells continues, the amount of water being produced increases. Eventually, the wells produce primarily water, and to recover any appreciable oil an extremely high amount of fluids has to be lifted from the well. The cost of lifting such high fluid volumes soon causes the well to become uneconomical. At this point, there may be as much as 90% of the reservoir oil still unrecovered. As previously discussed, water and fire floods are not effective in such a reservoir. Increasing pressure in the formation does not serve any particular purpose since the aquifer underlying the oil formation provides more than sufficient pressure.

Such a reservoir, however, can be more effectively produced by use of foam injection. Alternate slugs of gas and a foaming agent solution, consisting of a foaming agent and water, are pumped into the wellbore and out into the formation. The amount of fluid injected should equal the volume contained in the formation fractures. Sufficient gas should be utilized to allow for the amount of gas which will go into solution in formation oil, as well as compensation for formation pressure build-up. The injection of the foaming agent solution and the gas creates a foam in the formation. This foam will be located in the highly permeable fractures since the fractures will more readily accept the foaming materials. The slugs of the gas and the foaming agent solution are continued until excessive pressures occur. At this time, production wells are opened up to produce formation fluids. The action of the foam during the injection phase of the recovery process causes gas to enter the dense matrix and displace oil therein, either through displacement during the foaming cycle or by solution gas drive during the production cycle. This result is accomplished because of the substantial blocking of the formation fractures by the foam and the creation thereby of a higher pressure in the fractures than in the dense matrix. As the foam moves by the dense matrix some of the foaming agent surfactant is lost to the oil in the matrix, which causes a change in the elasticity and the viscosity of such oil. This change in elasticity and the viscosity allows some of the oil in the matrix adjacent the fractures to be torn away by the foam passing thereby, thus permitting gas to enter the portion of the pore vacated by the oil that was torn away. Once the gas enters the pore of the matrix, it will operate to displace additional oil therefrom and in addition a portion of the gas will go into solution in the oil which has not been displaced. This phenomonen has been observed in laboratory tests where foam displaced oil from a dead end pore. A dead end pore is one which does not have a flow path therethrough and therefore has only one opening which serves both as an entrance and an exit. It was observed that a gas bubble could enter such a dead end channel at the same time that oil was flowing out of it. Thus, the foam created a pressure differential which operated to drive gas into the dead end pore with the aid of the elasticity and the viscosity change in the oil.

Upon switching over to the production cycle, oil released from the matrix will serve to break down the foam in the fracture by creating a concentration gradient in the walls of the foam bubbles. When the foaming agent's surfactant concentrates due to the action of the crude oil, the bubbles tend to break and the foam thereby dissipates. Thus, during the production cycle fairly efficient flow is possible through the fractures due to the action of the crude oil on the foam.

This foaming process can be used by huff and puff operation through a single well or through a normal injection and production well system. In the huff and puff procedure, the foam is created through the same well that is subsequently used for production. After the production cycle, additional cycles of foaming and production can be utilized until such operations become uneconomical.

In a system where separate injection and production wells are utilized, the same basic approach is taken in that the fractures are filled with foam and the wells are subsequently produced. Here again, the foam and production cycles can be repeated until the operation is uneconomical. The foaming agent used should be selected so as to conform with constituents in the formation. For example, if the formation contains substantial amounts of calcium, foaming agents such as ammonium salts of ethoxylated sulfates and sodium N-methyl-N-oleoyltaurate can be used. In addition, a foaming agent should be selected which does not easily break down with minor amounts of crude oil associated therewith, but would break down with higher concentrations of crude oil. Generally, the foaming agent will comprise approximately one percent of the foaming agent solution with the remainder water. Gas used in conjunction with the foaming agent solution is preferably carbon dioxide, since crude oil is affected more by $CO_2$ than are other gases commonly used in other secondary recovery processes.

The foam should be generated in the formation because of several adverse effects which result if the foam is created at the surface. When foam is created at the surface, it is generated at a low pressure and upon being subjected to a high pressure such as in the formation, it frequently undergoes changes that reduce or eliminate its effectiveness. Additionally, it is often very difficult to pump a foam into a wellbore and force it into a formation, due to its high resistance to flow.

In the typical reservoir described above, creation of stable foam adjacent the original oil water contact would serve to retard further water enchroachment from the underlying aquifer. Thus, when the reservoir is converted to the production cycle and the foam in the fracture is dissipated by the crude oil, the foam below the level of the crude oil will tend to remain stable, thus preventing upward movement of the water to the wellbore. In addition to fractured limestone reservoirs, there are many sandstone reservoirs having highly dissimilar permeabilities for which the above described process could also be utilized.

While the recovery process has been described with reference to a specific reservoir, it is apparent that certain changes and modifications may be made without departing from this invention in its broader aspects, and therefore the aim in the appended claims is to cover all such modifications and changes that fall within the true spirit and scope of this invention.

What is claimed is:

1. A method of recovering oil from a formation having zones of both high and low permeability comprising: injecting a foaming agent solution into the formation; injecting a gas into the formation, a portion of which gas together with the foaming agent solution forms a foam in the formation; continuing the injection of the gas and foaming agent until excessive pressures occur thereby allowing the remainder of the injected gas to enter the low permeability zone and go into solution with oil therein; and relieving the pressure on the formation without intermediate treatment thereof thereby producing fluid from the low permeability zone by solution gas drive.

2. The method of claim 1 wherein the gas and foaming agent solution are comprised of water and a foaming agent and are injected into the formation in alternate slugs until the formation oil has been gas saturated.

3. The method of claim 1 wherein the gas volumes being injected into the formation are increased with time to compensate for formation pressure build-up and loss of gas to the less porous portions of the formation.

4. The method of claim 1 wherein the gas being injected is carbon dioxide wherein sufficient carbon dioxide is injected to saturate a substantial portion of the oil in the low permeability zones.

* * * * *